United States Patent
Fint et al.

(10) Patent No.: US 8,127,443 B2
(45) Date of Patent: Mar. 6, 2012

(54) METHOD OF FABRICATING A ROCKET ENGINE NOZZLE USING PRESSURE BRAZING

(75) Inventors: Jeffry A. Fint, Granada Hills, CA (US); Michael B. Hankins, Simi Valley, CA (US); Myron L. Jew, Canoga Park, CA (US); Donald G. Ulmer, Rescue, CA (US); Brian L. Wherley, Chatsworth, CA (US); William D. Romine, Thousand Oaks, CA (US); Frederick M. Kuck, Westlake Village, CA (US); Douglas S. Ades, North Hills, CA (US)

(73) Assignee: United Technologies Corporation, Hartford, CT (US)

( * ) Notice: Subject to any disclaimer, the term of this patent is extended or adjusted under 35 U.S.C. 154(b) by 492 days.

(21) Appl. No.: 12/271,920

(22) Filed: Nov. 16, 2008

(65) Prior Publication Data
US 2009/0100678 A1    Apr. 23, 2009

Related U.S. Application Data

(62) Division of application No. 11/086,084, filed on Mar. 22, 2005, now Pat. No. 7,596,940.

(51) Int. Cl.
*B21K 25/00* (2006.01)
*F02K 9/00* (2006.01)

(52) U.S. Cl. ............. 29/889.22; 29/890.142; 29/890.01; 29/DIG. 4; 60/257; 228/221; 228/233.1; 228/233.2

(58) Field of Classification Search ............... 29/889.22, 29/890.142, DIG. 4, 890.01; 228/221, 245–255, 228/233.1–234.1; 60/257, 770, 266, 267, 60/260; 239/127.1
See application file for complete search history.

(56) References Cited

U.S. PATENT DOCUMENTS
3,190,070 A    6/1956  Neu, Jr.
(Continued)

FOREIGN PATENT DOCUMENTS
EP    1089486    4/2001

OTHER PUBLICATIONS

"Hot Isostatic Processing", Lindell Pearson AE 510, http://www.engr.ku.edu/~rhale/ae510/websites_f02/HotIsostaticProcessing.ppt (date unknown), 15 pages.

(Continued)

*Primary Examiner* — Sarang Afzali
(74) *Attorney, Agent, or Firm* — Carlson Gaskey & Olds, P.C.

(57) ABSTRACT

A method of fabrication of a rocket engine nozzle assembly using pressure brazing generally includes initially assembling a rocket engine nozzle liner into a rocket engine nozzle jacket for a rocket engine nozzle assembly. The rocket engine nozzle assembly may then be sealed. Prior to pressure brazing the rocket engine nozzle assembly, pressure brazing parameters may be determined. The pressure brazing may be performed with the determined pressure brazing parameters to complete the fabrication of the rocket engine nozzle. The rocket engine nozzle assembly may include a rocket engine nozzle jacket and a rocket engine nozzle liner having a plurality of channels, with the space between each channel defining a land, and the rocket engine nozzle liner having at least a pair of endlands disposed at each end thereof. The rocket engine nozzle liner is bonded to the rocket engine nozzle jacket by the endlands being bonded to the nozzle jacket and the lands being pressure brazed to the nozzle jacket.

16 Claims, 8 Drawing Sheets

U.S. PATENT DOCUMENTS

| | | | |
|---|---|---|---|
| 3,182,448 A | 5/1965 | Rabe | |
| 3,254,395 A | 6/1966 | Baehr | |
| 3,507,449 A | 4/1970 | Butter | |
| 3,595,025 A | 7/1971 | Stockel et al. | |
| 3,897,316 A | 7/1975 | Huang | |
| 4,582,678 A | 4/1986 | Niino et al. | |
| 4,584,171 A | 4/1986 | Niino et al. | |
| 4,890,454 A | 1/1990 | Schmidt et al. | |
| 4,942,653 A | 7/1990 | Hawkinson | |
| 5,233,755 A | 8/1993 | Vandendriessche | |
| 5,473,817 A | 12/1995 | Schnoor et al. | |
| 5,477,613 A | 12/1995 | Bales et al. | |
| 5,501,011 A | 3/1996 | Pellet | |
| 5,701,670 A | 12/1997 | Fisher et al. | |
| 5,793,548 A | 8/1998 | Zook | |
| 5,844,920 A | 12/1998 | Zook et al. | |
| 5,999,110 A | 12/1999 | Blaum et al. | |
| 6,023,386 A | 2/2000 | Reed et al. | |
| 6,107,596 A | 8/2000 | Semenov et al. | |
| 6,173,430 B1 | 1/2001 | Massoudi | |
| 6,249,896 B1 | 6/2001 | Ho et al. | |
| 6,591,499 B1 | 7/2003 | Lundgren | |
| 6,688,100 B1 | 2/2004 | Wherley et al. | |
| 6,799,418 B2 | 10/2004 | Haggander et al. | |
| 6,907,662 B2 | 6/2005 | Lundgren | |
| 6,945,032 B2 | 9/2005 | Lundgren | |
| 7,132,781 B2 * | 11/2006 | Moler et al. | 310/328 |
| 7,156,011 B2 | 1/2007 | Morris et al. | |
| 7,188,417 B2 | 3/2007 | Weeks | |
| 7,299,622 B2 | 11/2007 | Haggander | |
| 7,302,794 B2 | 12/2007 | Haggander | |

OTHER PUBLICATIONS

"Upgrading the Space Shuttle", O'Connor et al., National Academy Press, Washington, D.C., 1999, pp. 1-72.

"Aerojet Wins $5 Million Contract to Study Channel Wall Nozzle for Shuttle Main Engine", Press Release, http://www.spaceref.com/news/viewpr.html?pid=4990, May 29, 2001, 2 pages.

"Space Launch Initiative Triggers Hydrocarbon Engine War", Morring, Jr., Aviation Week & Space Technology Apr. 29, 2002, 5 pages.

"Encyclopedia Astronautica", RD-0120, http://www.astronautix.com/engines/rd0120.htm, 2003, 2 pages.

"Aerojet and Pratt & Whitney Achieve Three SLI Milestones, Move Closer to COBRA Engine Prototype", Press Release, http://www.pratt-whitney.com/pr_052302.asp, 2003, 2 pages.

"What is Hot Isostatic Processing?", Kittyhawk Products, http://www.kittyhawkinc.com/what_os_hot_isostatic_processing.htm, 2003, 3 pages.

HIP Q&A, http://www,kobelco.co.jp/p109/05/p164_6_le.htm, 2003, 3 pages.

* cited by examiner

METHOD OF FABRICATING A ROCKET ENGINE NOZZLE USING PRESSURE BRAZING

The present invention is a divisional application of U.S. patent application Ser. No. 11/086,084, filed Mar. 22, 2005, now U.S. Pat. No. 7,596,940.

BACKGROUND

The present invention is generally related to rocket engine nozzles, and more particularly, rocket engine nozzles that are fabricated using pressure brazing.

Reusable rocket engine nozzles are typically constructed from tubes brazed together inside a multi-piece high strength nozzle jacket and manifold assembly. The tubes carry a coolant to cool the rocket engine nozzle during operation. Another method of constructing rocket engine nozzles is by milling slots into a nozzle liner and bonding the nozzle liner into a nozzle jacket and manifold assembly. The slots of the nozzle liner and the interior surface of the nozzle jacket create channels for accommodating the coolant.

For tube nozzles, the tubes that accommodate the coolant receive coolant flow from a common inlet manifold and discharge the coolant into a common discharge manifold. To provide hot gas containment and coolant containment, braze joints are required at each tube-to-tube, tube-to-nozzle jacket and tube-to-manifold interface. This is typically accomplished with multi-braze cycles involving problems such as complex tooling to hold all of the parts in the proper relative position with adequate pressure at each braze joint, which typically requires expendable pressurized bags, interfaced to ensure a leak proof and structurally adequate braze joint.

U.S. Pat. No. 5,701,670, issued to Fisher et al. on Dec. 30, 1997, the entirety of which is hereby incorporated by reference herein, and that is assigned to the assignee of the present invention, discloses a method of fabricating a rocket engine combustion chamber having a structural jacket and a coolant liner. A throat support is assembled around the coolant liner. Then the coolant liner along with the throat support section is installed in the structural jacket. Once the coolant liner and throat support assembly is in place within the structural jacket, seal joints are made. Inlet and outlet manifolds are capped off for the bonding process. Internal voids created by coolant passages, inlet and outlet manifolds, and between the throat support and the structural jacket are evacuated by a vacuum pump. The entire assembly is then placed into a brazing furnace which is pressurized and brought up to bonding temperature.

SUMMARY

A method of fabricating a rocket engine nozzle generally includes assembling a nozzle jacket and a nozzle liner, which includes integral inlet and exit manifolds, to provide a rocket engine nozzle assembly, and bonding the nozzle jacket to the nozzle liner by pressure brazing the rocket engine nozzle assembly.

A method of fabricating a rocket engine nozzle by pressure brazing includes determining a brazing pressure range, a brazing temperature range, and a brazing period range, and preparing a rocket engine nozzle assembly for pressure brazing. The method may further include pressure brazing the rocket engine nozzle assembly, using a brazing pressure from the brazing pressure range, a brazing temperature from the brazing pressure range, and a brazing period from the brazing period range.

A method of fabricating a rocket engine nozzle by pressure brazing includes selecting a braze alloy, determining a brazing pressure range, a brazing temperature range, and a brazing period range, and preparing a rocket engine nozzle assembly for pressure brazing. The method may further include selecting the geometric features of the rocket nozzle, including the geometric features of the rocket nozzle's jacket, liner and manifolds to withstand the braze pressure at the brazing temperature without detrimental distortion while applying adequate pressure at the bond interfaces to insure a structurally acceptable braze joint.

A rocket engine nozzle generally includes a rocket engine nozzle jacket and a rocket engine nozzle liner, which includes a plurality of channels, the space between each channel defining a land, and the rocket engine nozzle liner having at least a pair of endlands disposed at each end thereof. The rocket engine nozzle liner may be bonded to the rocket engine nozzle jacket by having the lands and the endlands pressure brazed to the nozzle jacket.

DETAILED DESCRIPTION

Figure 1:
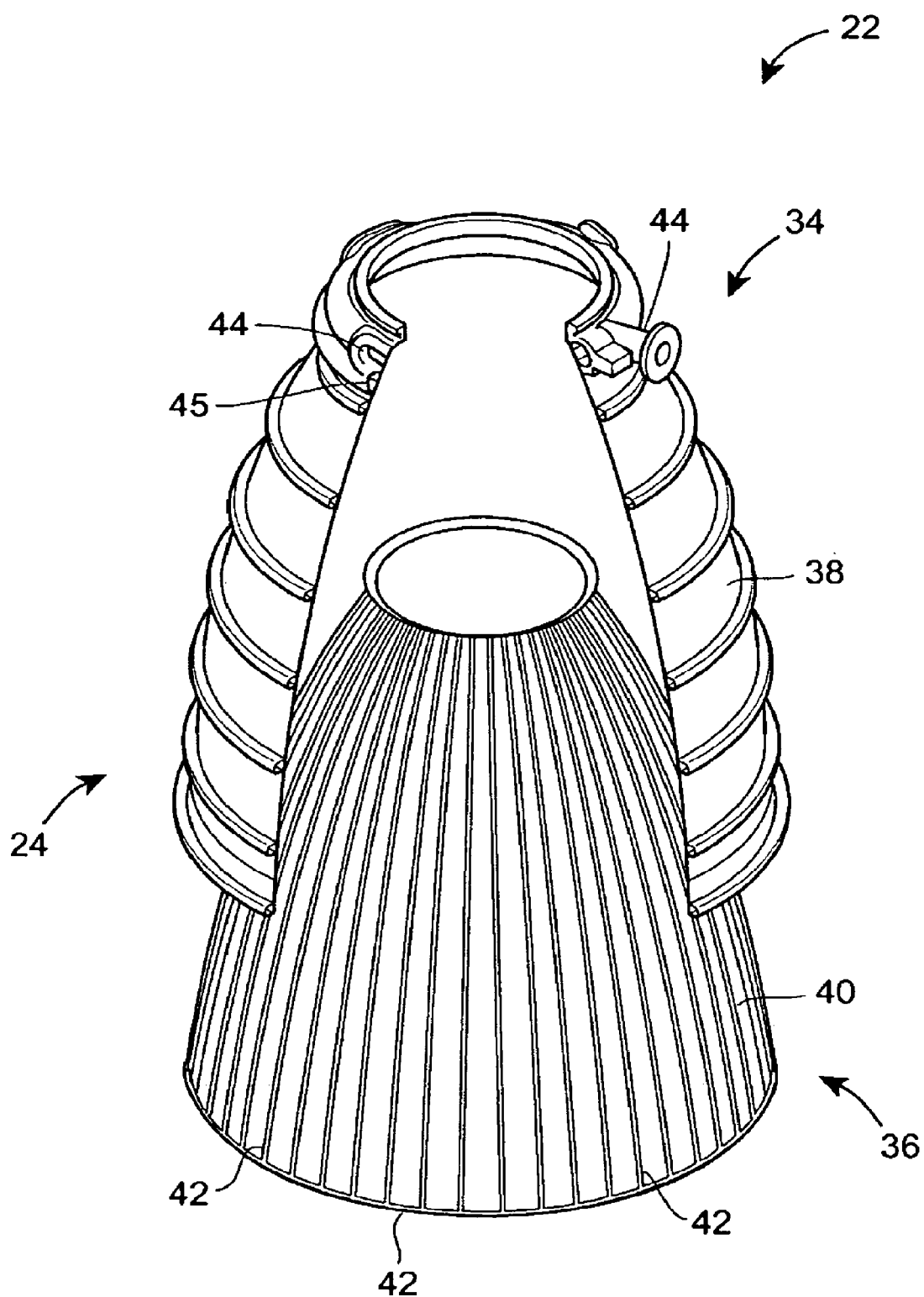
FIG. 1 is a perspective view of an example of a rocket engine nozzle that may be fabricated in accordance with the teachings of the present disclosure.
Figure 2:
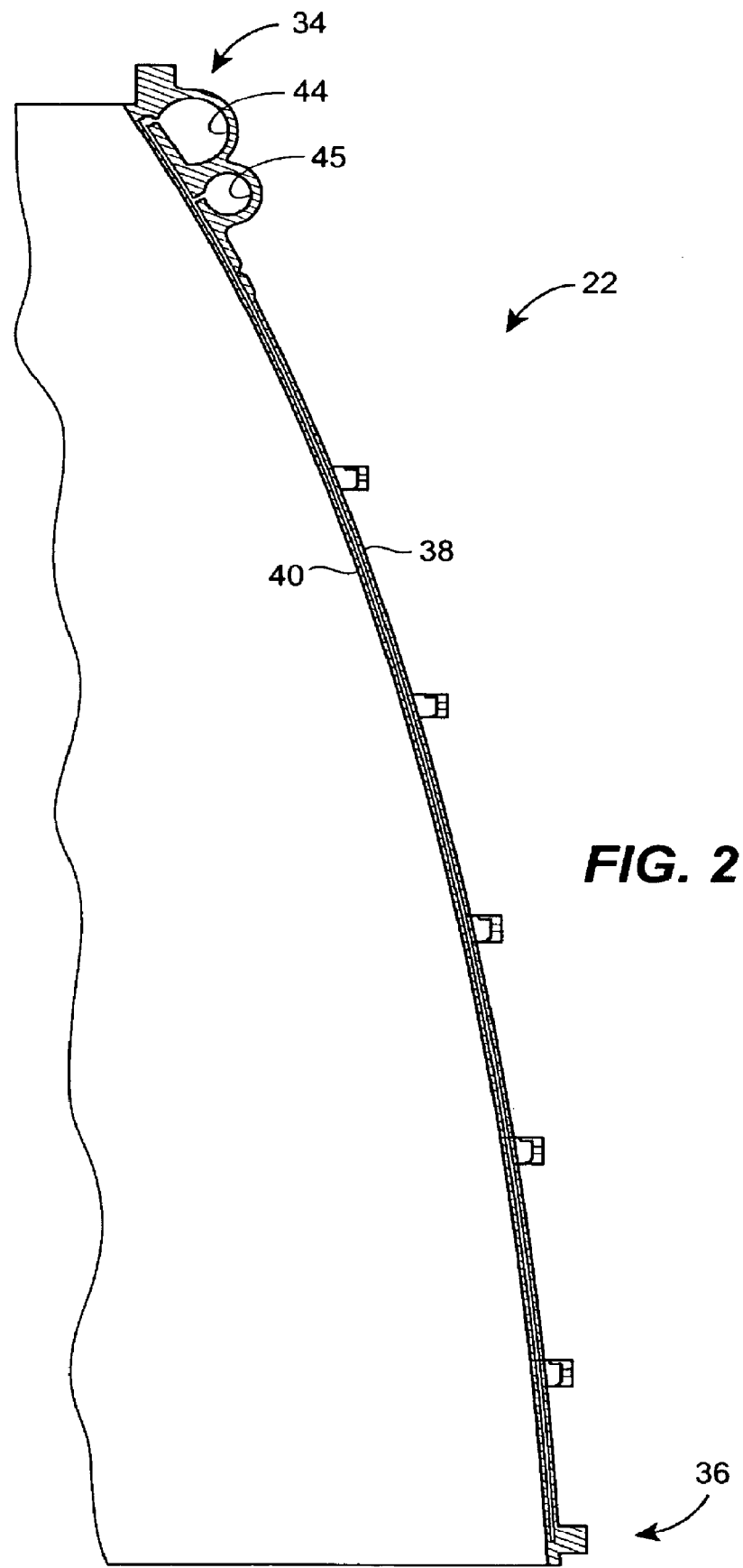
FIG. 2 is a partial cross-sectional view of the rocket engine nozzle of FIG. 1.

Referring to FIGS. 1 and 2, a rocket engine nozzle assembly 22 that may be fabricated by pressure brazing in accordance with teachings of the present disclosure is generally shown. The rocket engine nozzle assembly 22 expands in cross sectional area from a forward end portion 34 to an aft end portion 36. The rocket engine nozzle assembly 22 includes a nozzle jacket 38 and a nozzle liner 40, which form part of the rocket engine nozzle assembly 22. The shape of the exterior of the nozzle liner 40 generally corresponds to the shape of the interior of the nozzle jacket 38. Accordingly the nozzle liner 40 fits inside the nozzle jacket 38.

The nozzle liner 40 is slotted, and therefore, includes a number of channels 42 that extend from the forward end portion 34 to the aft end portion 36. The channels 42 may be connected to each other at both the forward end portion 34 and the aft end portion 36. The channels 42 may be formed, for example, by machining using a cutting tool such as that disclosed in Moms et al., U.S. patent application Ser. No. 10/787,027, entitled, "Depth Limiting Safeguard for Channel Machining," that is assigned to the assignee of the present invention, and the entirety of which is hereby incorporated by reference herein. When the nozzle liner 40 and the nozzle jacket 38 are assembled as shown in FIG. 2, the interior surface of the nozzle jacket 38 and the channels 42 form closed passages (not shown), in which a coolant circulates to cool the rocket engine nozzle assembly 22. To distribute and circulate the coolant in the channels 42, the nozzle jacket 38 includes an inlet manifold 44 and an outlet manifold 45 that may be connected to the channels 42 at the forward end portion 34 of the rocket engine nozzle assembly 22.

Figure 3:
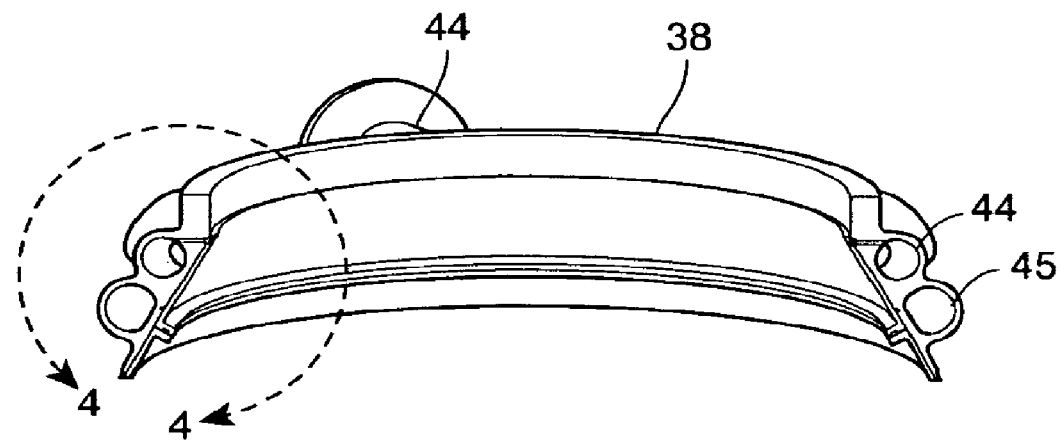
FIG. 3 is fragmentary cross-sectional view of a forward end of the rocket engine nozzle of FIG. 1.
Figure 4:
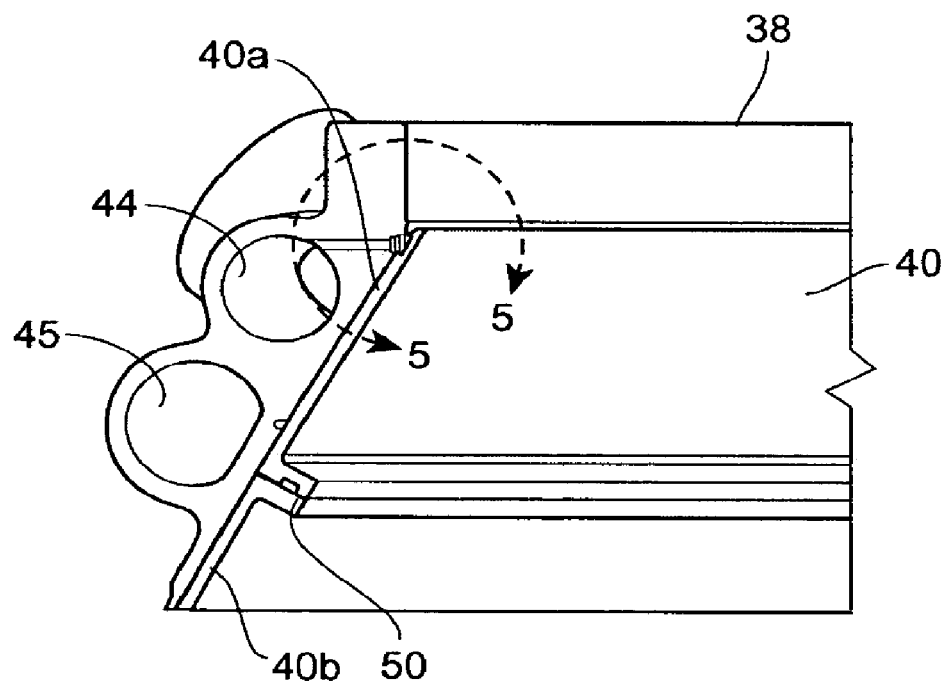
FIG. 4 is an enlarged view of area 4-4 of FIG. 3.

The nozzle liner 40 may be a multi-piece liner 40. For example, as shown in FIGS. 3 and 4, the forward end portion 34 of the nozzle liner 40 is shown to include two liner pieces 40a and 40b that may be joined at a liner joint 50. Similar to the welding or bonding of the endlands 46 and 48, the liner pieces 40a and 40b may be either welded together at the liner joint 50 or bonded together by brazing.

Figure 5:
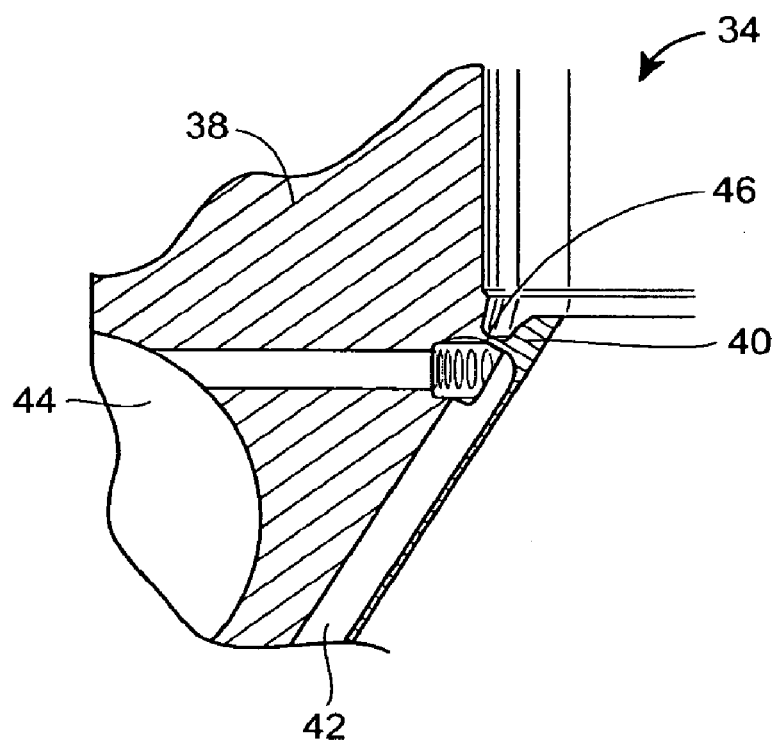
FIG. 5 is an enlarged view of area 5-5 of FIG. 4.
Figure 6:
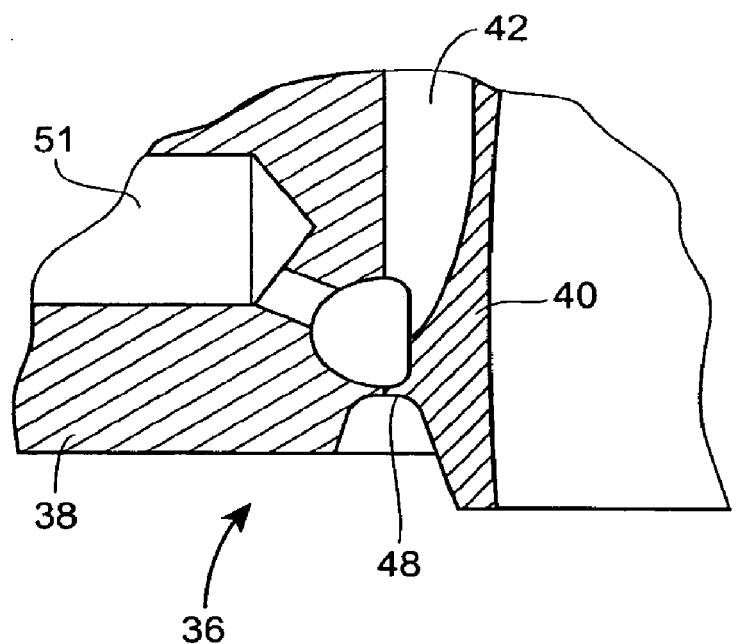
FIG. 6 is side fragmentary cross sectional view of an aft end of the rocket engine nozzle of FIG. 1.

Referring to FIGS. 5 and 6, the nozzle liner 40 may include a forward endland 46 and an aft endland 48. When the rocket engine nozzle assembly 22 is assembled, the forward endland 46 and the aft endland 48 may contact the nozzle jacket 38 at the forward end portion 34 and the aft end portion 36, respectively. The forward endland 46 and the aft endland 48 may be sealably bonded to the nozzle jacket 38 by welding, brazing, or like bonding methods.

By bonding the forward endland 46 and the aft endland 48 to the nozzle jacket 38, any space between the nozzle jacket 38 and the nozzle liner 40 becomes sealably enclosed. Accordingly, the bonds at the forward endland 46 and the aft endland 48 are referred to herein as the closeout bonds. Because the closeout bonds seal the space between the nozzle jacket 38 and the nozzle liner 40, the rocket engine nozzle assembly 22 functions as a pressure and temperature retort to provide robust pressure brazed joints between the nozzle jacket 38 and the nozzle liner 40, using a single brazing operation to bond the nozzle jacket 38 to the nozzle liner 40.

The nozzle jacket may include instrumentation ports 51 (FIG. 6) in the vicinity of the aft end portion 36, for example, to monitor the pressure and/or temperature in that vicinity. The closeout bonds in the vicinity of the endlands 46 and 48 may be machined out after the overall pressure brazing of the engine nozzle assembly 22 is completed, if desired, for example, to minimize weight.

Figure 7:
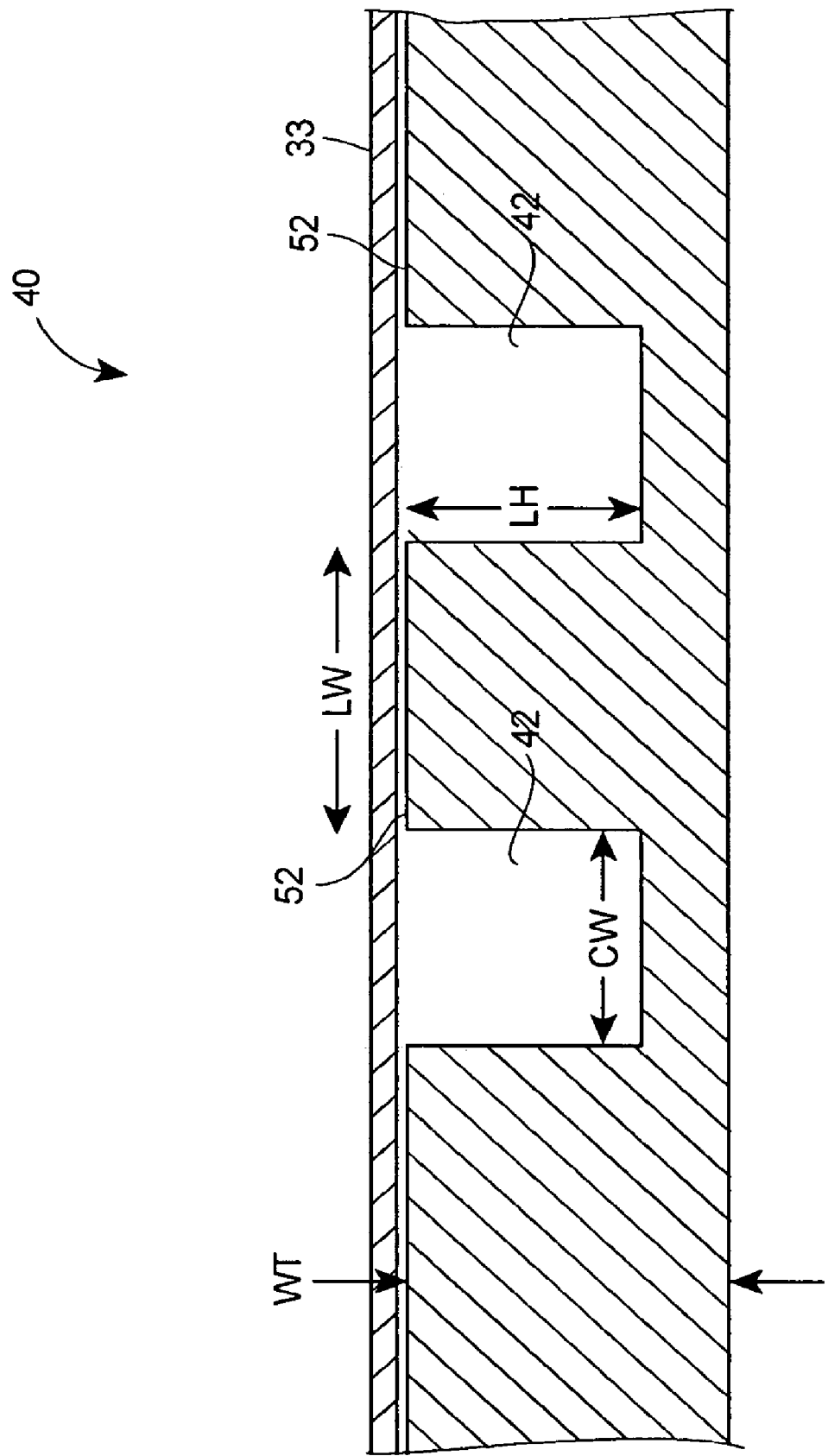
FIG. 7 is a fragmentary cross sectional view of a rocket engine nozzle liner of the rocket engine nozzle of FIG. 1.

Referring to FIG. 7, the space between the channels 42, which is shown as a land 52, is the bonding surface that is Hot Isostatic Pressure (HIP) bonded to the nozzle jacket 38. Accordingly, the bonding surface area may be relatively small compared to the internal surface area of the nozzle jacket 38 and the exterior surface area of the nozzle liner 40.

HIP bonding or brazing may be used for bonding parts that may be constructed from similar or dissimilar materials. For example, the nozzle liner 40 may include a copper alloy forward section and a steel aft section, and/or multiple non-weldable sections, such as multiple A-286 liners.

In HIP bonding, the parts or components are placed in a pressure furnace that can reach pressures of 200 Mpa (29,000 Psi) and temperatures of 2000° C. (3600° F.). During HIP bonding, the parts to be bonded undergo slight macroscopic deformation, and the surfaces of the parts to be bonded collapse and join with each other. Additionally, with the use of a braze alloy between the parts to be bonded, the braze alloy melts and provides bonding between the parts to provide a stronger and near perfect bond.

Figure 8:
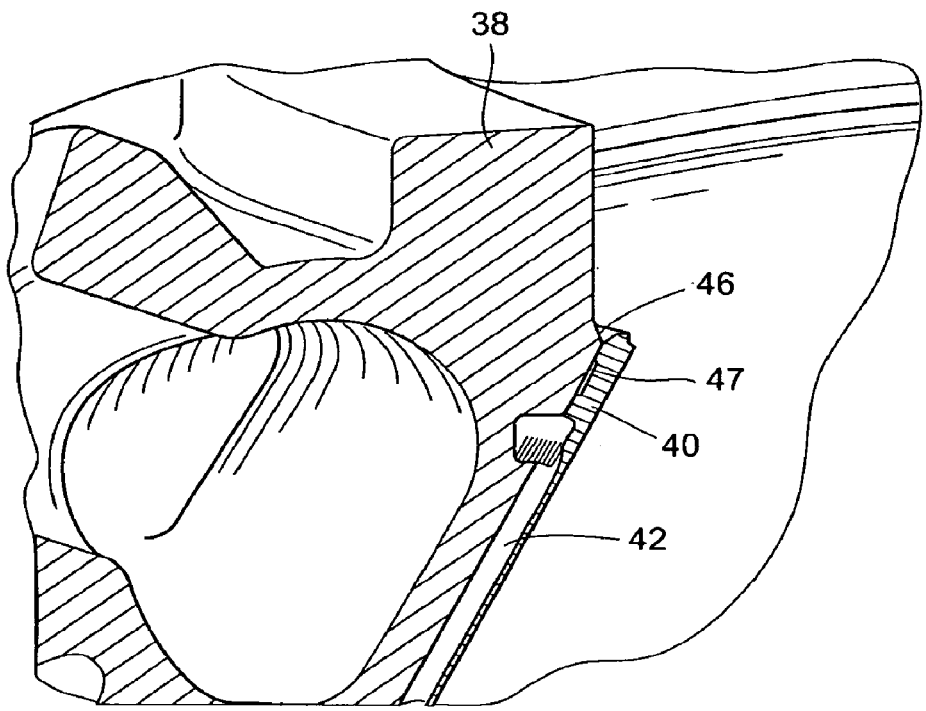
FIG. 8 is a fragmentary cross-sectional view, similar to that of FIG. 5, of an alternative embodiment of a forward end of the rocket engine nozzle of FIG. 1.
Figure 9:
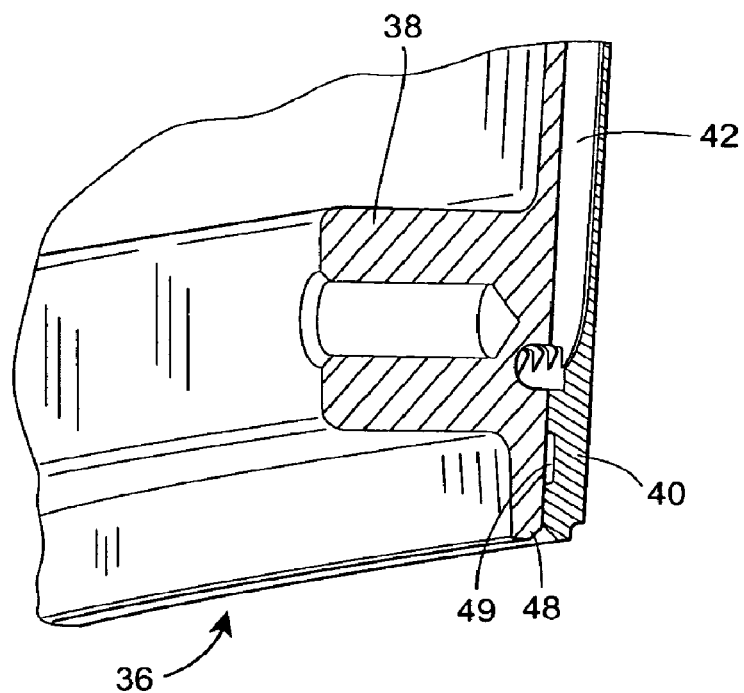
FIG. 9 is a fragmentary cross-sectional view, similar to that of FIG. 6, of an alternative embodiment of an aft end of the rocket engine nozzle of FIG. 1.

Alternatively, as shown in FIGS. 8 and 9, the endlands 46 and 48 may be bonded to the nozzle jacket 38 by a brazing process, such as gas tungsten arc brazing. To increase bond pressure without increasing the pressure exerted on the rocket engine nozzle assembly 22 during pressure brazing, grooves 47 and 49, respectively, may be cut in the endlands 46 and 48. The grooves 47 and 49 reduce the bond area between the endlands 46 and 48 and the nozzle jacket 38, and therefore, provide pressure amplification at the bond area without having to increase the pressure during pressure brazing to achieve good closeout bonds. Some of the bond area may be removed from the rocket engine nozzle assembly 22 after the overall pressure brazing is completed, if desired, for example, to minimize weight.

Figure 10:
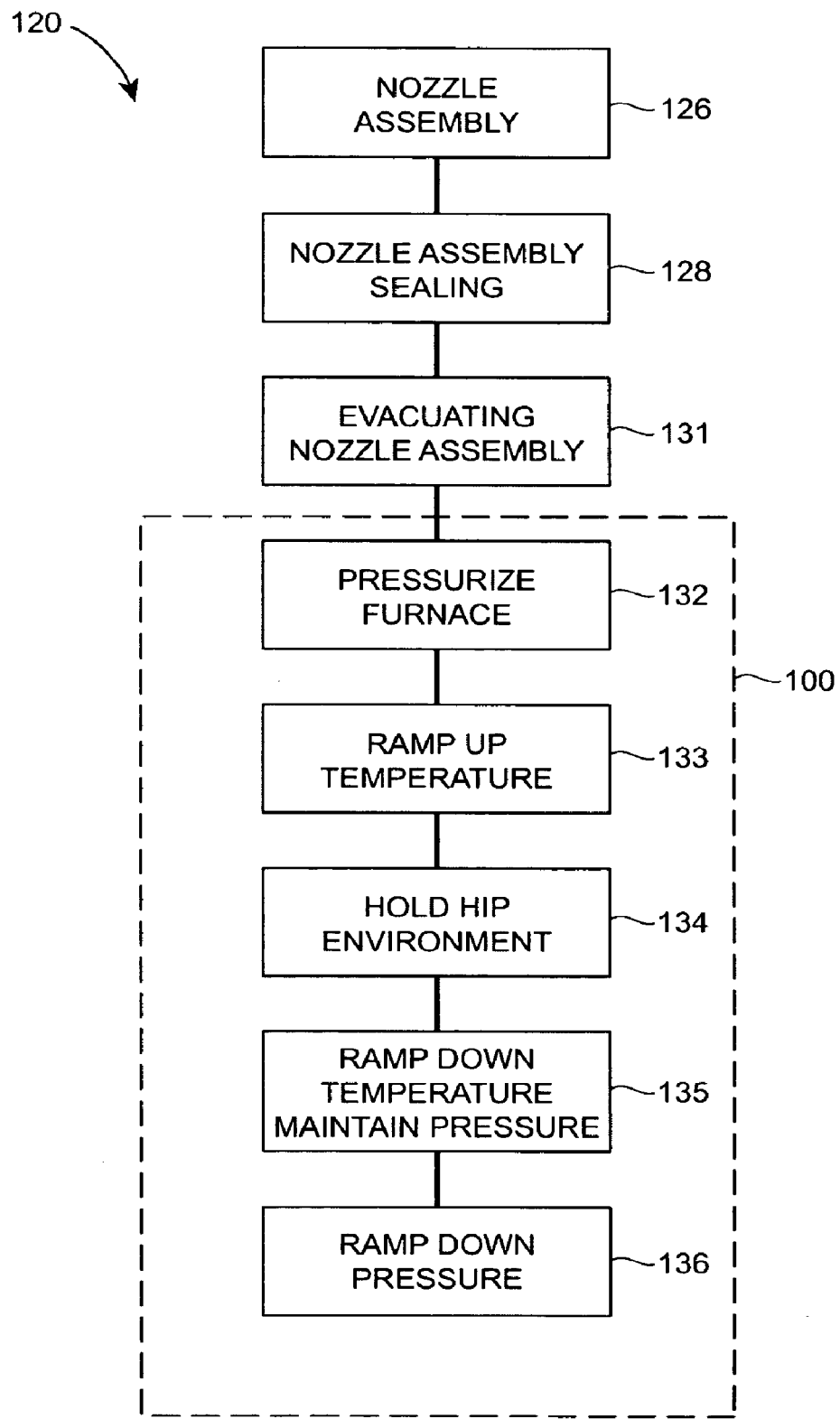
FIG. 10 is a block diagram of a method of fabrication of a rocket engine nozzle using pressure brazing in accordance with the teachings of the present disclosure.

Referring to FIG. 10, a method 120 of fabrication of the rocket engine nozzle assembly 22 using a single pressure brazing operation 100 in accordance with the teachings of the present disclosure is generally shown. The rocket engine nozzle assembly 22, including the nozzle jacket 38 and the nozzle liner 40, is initially assembled at 126. The rocket engine nozzle assembly 22 may be assembled as indicated at 126, by assembling together the nozzle liner 40, the nozzle jacket 38, and a braze foil (not shown). The braze foil provides bonding of the nozzle jacket 38 to the nozzle liner 40 during a pressure brazing process 100. Prior to the pressure brazing process 100, the joints to be bonded may be coated with a material to increase the bond strength and/or to promote braze alloy flow. During the nozzle assembly at 126, the braze foil may be placed between the nozzle liner 40 and the nozzle jacket The braze foil may be secured to either the nozzle jacket 38 or the nozzle liner 40 at various points by methods that are known to those of ordinary skill in the art, such as spot welding. The braze foil may be shaped to correspond to the shape of the nozzle jacket 38—and the nozzle liner 40. Alternately, the braze foil may be in sections or strips that may be secured to either the nozzle liner 40 or the nozzle jacket 38. In yet another alternate example, the brazing material may be electroplated or applied by other physical deposition methods on any one or both of the nozzle jacket 38 and the nozzle liner 40.

The braze foil may be constructed from typical brazing materials that are well known to those of ordinary skill in the art. In the disclosed example, the braze foil may be constructed from a gold based alloy with a melting point of about 982 to 1070 C.° (1800-1950° F.). Such gold based alloys include, but are not limited to, Nioro, RI-46, and Palniro-7.

A nominal gap between the nozzle liner 40 and the nozzle jacket 38 allows assembly of the rocket engine nozzle assembly 22 and accommodates the braze foil. Relative clocking and axial positions of the nozzle jacket 38 and the nozzle liner 40 may be controlled by physical features thereof to facilitate assembly.

Prior to pressure brazing the rocket engine nozzle assembly 22, the forward end portion 34 and the aft end portion 36 of the rocket engine nozzle assembly 22 may be sealed, as indicated at 128. The nozzle sealing step 128 may include welding the endlands 46 and 48 to the nozzle jacket 38 to form the closeout bonds, as shown in FIGS. 5 and 6. The forward end portion 34 and the aft end portion 36 may each be sealed using brazing or welding, as noted above in connection with FIGS. 5 through 8. The nozzle liner 40 may then be bonded to the nozzle jacket 38 by the disclosed pressure brazing operation at 132-1 36 to complete fabrication of the rocket engine nozzle assembly 22. As will become apparent from the following, the disclosed pressure brazing system and method utilize the nozzle jacket 38 and the nozzle liner 40 as a pressure and temperature vessel to provide robust pressure brazed joints between the nozzle jacket 38 and the nozzle liner 40.

The rocket engine nozzle assembly 22 may be initially evacuated as indicated at 131, to ensure that the rocket engine nozzle assembly 22 is sealed or leak tight after the nozzle sealing step 128. Evacuating the rocket engine nozzle assembly 22 also ensures that closeout bonds are strong enough to withstand the vacuum conditions. After the forward end portion 34 and the aft end portion 36 of the rocket engine nozzle assembly 22 are bonded to form the closeout bonds, the rocket engine nozzle assembly 22 may be pressure brazed as indicated at 100. The rocket engine nozzle assembly 22 may be placed in a HIP furnace (not shown) to perform the pressure brazing operation as indicated at 132-136.

Figure 11:
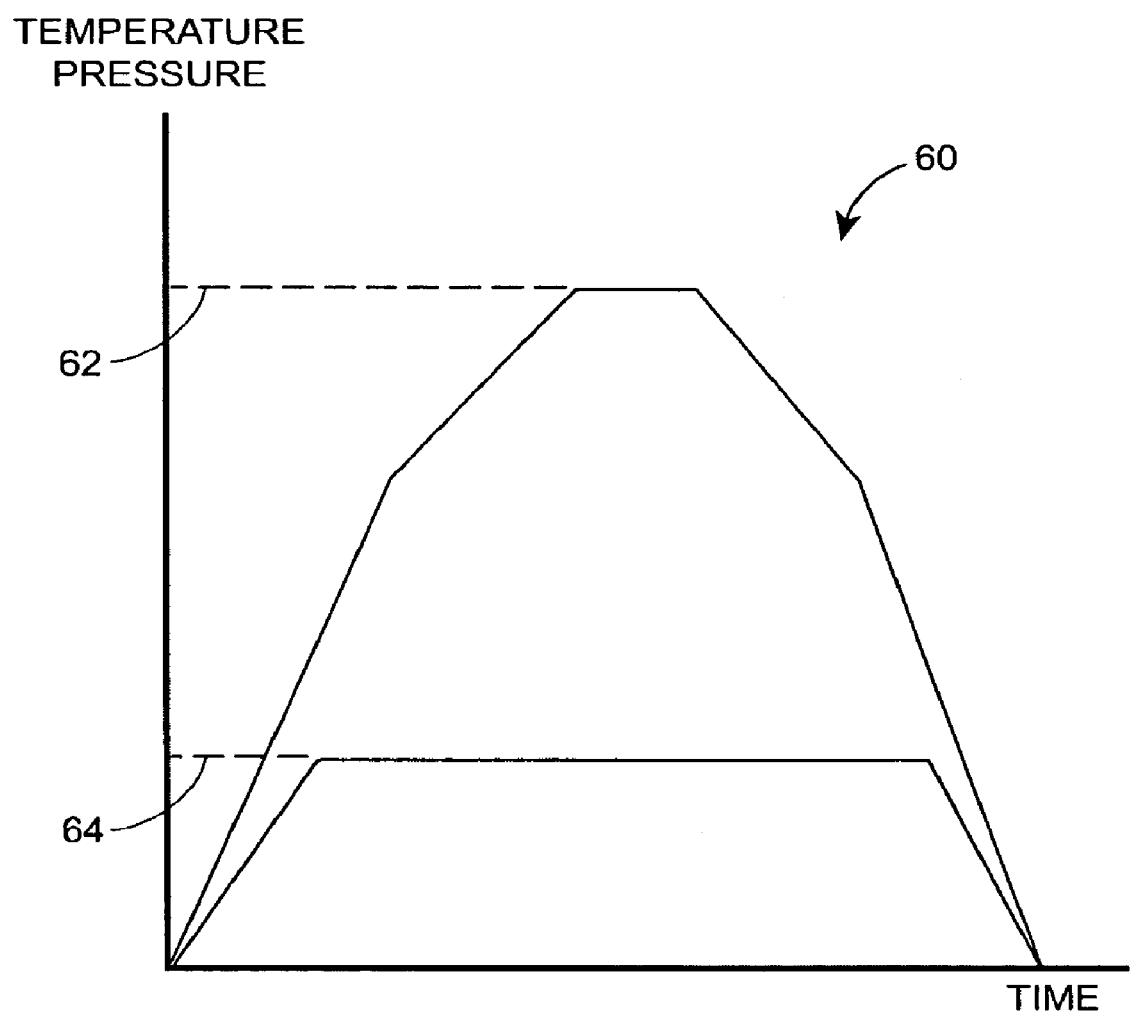
FIG. 11 is a chart showing a graphical depiction of an exemplary temperature and pressure profile for a pressure brazing method performed in accordance with the teachings of the present disclosure.

Referring to FIG. 11, after the rocket engine nozzle assembly 22 is placed in the HIP furnace, the temperature and pressure of the furnace may be varied in accordance with a temperature and pressure profile 60 to provide acceptable bonds between the nozzle jacket 38 and the nozzle liner 40 (shown in FIG. 10 at 132-136). The profile of the temperature and pressure excursions in the HIP furnace during the pressure brazing process may be based on experimental data, such as by data obtained from pressure brazing of subscale models of the rocket engine nozzle assembly 22. Additionally, the profile may be initially developed by numerical analysis, such as by Finite Element Analysis. Subsequently, the results of the numerical analysis can be verified by experimental data obtained from testing prototype and/or subscale nozzles.

The temperature and pressure excursions of the profile 60 may be specific to a rocket engine nozzle assembly 22 having a unique size, shape, materials or other characteristics. For example, depending on the braze alloy used, the upper limit of the temperature may correspond to the melting point of the braze alloy. In yet another example, the temperature and pressure profile 60 may change based on the expansion ratio of the rocket engine nozzle assembly 22. Accordingly, the temperature and pressure profile 60 may be unique to rocket engine nozzle assemblies 22 that are within a unique range of size, shape, and/or material characteristics. The profile of the temperature and pressure excursions may include ramping up (i.e., increasing in steps) or increasing temperature and pressure at constant or variable rates, holding the temperature and/or the pressure at a level for a period of time, and ramping down (i.e., decreasing in steps) or decreasing the temperature and pressure at constant or variable rates.

Referring to FIGS. 10 and 11, an exemplary temperature and pressure profile chart for the disclosed pressure brazing of the rocket engine nozzle assembly 22 is shown. During pressure brazing, the temperature is ramped up or increased as indicated at 133 to reach a brazing temperature 62. The rate at which the temperature is increased, i.e., delta temperature, may be determined to keep sufficient contact pressure on bond surfaces of the rocket engine nozzle assembly 22 to creep the bond surfaces and provide a good bond. The pressure is also ramped up or increased as indicated at 132 in the HIP furnace until it reaches a brazing pressure 64.

Once the HIP furnace reaches a HIP environment as indicated at 134, which is defined by the HIP furnace reaching the brazing pressure 64 and the brazing temperature 62, the HIP environment is maintained for a period of time. While in the HIP environment, the braze alloy melts and provides bonding between the bond surfaces of the rocket engine nozzle assembly 22. Accordingly, the brazing pressure 64 and the brazing temperature 62 may be determined such that the braze alloy melts and/or flows between the bonded surfaces without excessive flow out.

The thickness of the braze foil may be determined to provide an acceptable bond between the nozzle liner 40 and the nozzle jacket 38. A thick braze foil may provide a good bond, but it may also cause excessive runoff. To prevent runoff of the braze foil during HIP bonding, however, the thickness of the braze foil may be reduced without sacrificing bond integrity. Additionally, other methods may be used to reduce or eliminate braze foil runoff without sacrificing HIP bond integrity. For example, strips of the braze foil can be used only at the joints to be bonded to reduce runoff. In another example, the aft end portion 36 may include an annular shaped reservoir (not shown) in which the braze foil runoff collects during the HIP bonding process. In yet another example, the braze foil runoff may be drained from the rocket engine nozzle assembly 22 from drain ports (not shown) distributed on the rocket engine nozzle assembly 22.

After holding the HIP, environment as indicated at 134, the temperature of the HIP furnace is ramped down as indicated at 135. Because the nozzle jacket 38 and the nozzle liner 40 may be constructed from different materials, too rapid a temperature decline may cause excessive tension at the bonded surfaces as a result of differential temperatures at the bonded surfaces. Accordingly, an appropriate rate of temperature decline may be determined to reduce or eliminate the tension at the bonded surfaces. As shown in FIG. 11, while the temperature in the HIP furnace is being ramped down as indicated at 135, the pressure may be maintained at the brazing pressure 64. The holding of the brazing pressure 64 while the temperature is ramping down keeps the strains in the bonded surfaces low and prevents stress rupture failure. The pressure in the furnace is then ramped down as indicated at 136 to complete the pressure brazing as indicated at 100.

As also shown in FIG. 11, the brazing pressure 64 may be generally maintained for a longer period than the brazing temperature 62. In other words, the pressure in the furnace may be maintained at the brazing pressure 64 while the temperature is ramping up to the brazing temperature 62 and ramping down from the brazing temperature 62. The brazing pressure 64 may be maintained to ensure that bond surfaces remain in contact throughout the bonding process, and that sufficient pressure between the bonded surfaces is maintained.

Successful pressure brazing of the rocket engine nozzle assembly 22 may require intimate contact along the bonded surfaces of the rocket engine nozzle assembly 22. Surfaces that are non-coplanar can potentially produce imperfect bonds, which can disbond when loaded. One of ordinary skill in the art will recognize that bonded surfaces free from imperfections due to gaps, waviness, etc., may not always be guaranteed. Deformation and/or yielding at the bond surfaces provide better contact between the two surfaces to be bonded. The ability of a material to creep provides the mechanism to achieve better contact between the surfaces to be bonded. Accordingly, the pressure and temperature profile may be determined so that the material at the bonded surfaces creep to provide a good bond.

However, excessive material deformation and creep may have an adverse effect on the final shape of the channels 42. Excessive pressure and temperature during HIP bonding can distort or collapse the channels 42. Such distortion or collapse may be severe enough to restrict the flow of coolant through the channels 42. As noted above with regard to FIG. 7, because the space between the channels 42, which is shown as a land 52, is the bonding surface that is HIP bonded to the nozzle jacket 38, the bonding surface area may be relatively small compared to the internal surface area of the nozzle jacket 38 and the exterior surface area of the nozzle liner 40.

Accordingly, the brazing pressure 64 needs to be high enough to adequately load the bond joints, yet low enough to that there is no excessive distortion of the nozzle liner 40.

As noted in the foregoing, the geometry of the channels 42 affects their performance in functioning as conduits for the cooling fluid. Accordingly, the shape of the cooling channels 42 should be preserved after the above-described pressure and temperature excursions to which the rocket engine nozzle assembly 22 is subjected during the HIP bonding process. The temperature and pressure profile 60 that is required for acceptable bonds may be balanced against the operational requirements of the channel geometry. Therefore, each unique channel geometry may require one or a range of unique temperature and pressure profiles 60.

The shape of the temperature and pressure profile 60 may be identified by experimentally and/or numerically investigating the effects of the temperature and pressure profile 60 on the geometry of the channels 42. A temperature and pressure profile 60 for a range of acceptable channel configurations may be created by first characterizing the creep properties of the materials of the rocket engine nozzle assembly 22 and establishing the functional sensitivity of the channels 42 to changes in channel area, i.e., coolant passage area. The initial sizing of the channels 42 may later be refined with experimental and/or numerical analysis based on channel configurations at various axial stations along flow path of the coolant. The experimental and/or numerical analysis may be used to assess the following factors: bondline gap, channel distortion, nozzle liner creep, and post HIP bond stress. Bondline gap is defined as the prebraze radial distance between the liner land and the jacket inside surface at a given axial location at nozzle assembly. Channel distortion may represent waviness of the walls of the channels 42 and reduction in the coolant flow area. Nozzle liner creep may determine coolant flow area reduction as a result of creep in the nozzle liner 40. Post HIP bond stress may define the residual stress or stress rupture during the HIP braze and/or subsequent aging period of the rocket engine nozzle assembly 22.

Referring to FIG. 7, channel geometry dimensions that may be used to determine a range of temperature and pressure profiles 60 include wall thickness (WT), channel width (CW), land width (LW), and channel height (LH). The combination of these geometric elements of the channels 42 may be evaluated based on at least the following criteria: creep limited CW/LW, bond pressure CW/LW, creep limited WT/CW, and operations limited WT/CW. Creep limited CW/LW provides criteria based on material creep properties for determining the allowable temperature and pressure profile 60 before channel flow area is reduced to an unacceptable level. However, sufficient load should also be produced to allow the bond surfaces to conform to any imperfections or irregularities in the bonding surfaces. The ratio CW/LW may affect the pressure magnification at the bondline. The pressure achieved by this ratio should typically be at or above the effective bond pressure. The ratio creep limited WT/CW may be indicative of hot channel wall distortion due to pressure. The ratio operations limited WT/CW may affect primary stress margins during operation. Nozzle geometry that falls within the range of the above aspect ratios would typically result in successful bonding of a nozzle liner 40 and the nozzle jacket 38 that will meet both fabrication and operational requirements.

The nozzles with slotted liners provide a more robust and lower cost alternative to the tube wall nozzles. In nozzles with slotted liners, braze joints are only required between the nozzle liner and the nozzle jacket with integral manifolds. The concentric liner and jacket assembly are sealed at each end to act as the pressure bed for applying uniform pressure to the braze interface, and by using the nozzle assembly itself as a temperature and pressure retort, complex tooling is not required to hold parts of the nozzle assembly in a proper relative position during brazing.

Persons of ordinary skill in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the teachings of the invention.

What is claimed is:

1. A method of fabricating a rocket engine nozzle comprising:
   assembling a nozzle jacket and a nozzle liner to provide a rocket engine nozzle assembly, the nozzle liner having a plurality of channels, the space between each channel defining a land, and the nozzle liner having at least a pair of endlands disposed at each end thereof;
   sealing the nozzle assembly at a forward end and an aft end of the rocket engine nozzle assembly with a plurality of seals, wherein the seals are provided between the nozzle jacket and the endlands of the nozzle liner; and
   bonding the nozzle liner to the nozzle jacket by pressure brazing the rocket engine nozzle assembly using a single pressure brazing operation after said sealing step.

2. The method of claim 1, wherein the bonding of the nozzle jacket to the nozzle liner by pressure brazing comprises:
   evacuating the rocket engine nozzle assembly;
   placing the rocket engine nozzle in a furnace;
   pressurizing the furnace to a brazing pressure;
   increasing a temperature in the furnace to a brazing temperature;
   holding the brazing pressure and the brazing temperature for a brazing period; and
   decreasing the temperature in the furnace while holding the furnace pressurized at the brazing pressure.

3. The method of claim 2, further comprising determining a brazing pressure range, a brazing temperature range, and a brazing period range, wherein the brazing pressure is within the brazing pressure range, the brazing temperature is within the brazing temperature range, and the brazing period is within the brazing period range.

4. The method of claim 3, wherein the determining is performed by a finite element analysis.

5. The method of claim 1, wherein the assembling comprises placing a brazing alloy between the nozzle jacket and the nozzle liner, the brazing alloy bonding the nozzle jacket to the nozzle liner during pressure brazing of the rocket engine nozzle assembly.

6. The method of claim 1, wherein said seals are formed by brazing the nozzle jacket and the nozzle liner at a forward end and an aft end of the rocket engine nozzle assembly.

7. The method of claim 1, wherein said seals are formed by welding the nozzle jacket and the nozzle liner at a forward end and an aft end of the rocket engine nozzle assembly.

8. The method of claim 1, further including that said seals remain in place after said bonding step.

9. The method claim 1, further including that said endlands remain associated with said rocket engine nozzle assembly after said bonding step.

10. The method of claim 1, further including that said seals sealably enclose any space between said nozzle jacket and said nozzle liner.

11. The method of claim 10, wherein said seals form closeout bonds.

12. A method of fabricating a rocket engine nozzle by pressure brazing comprising:
- determining a brazing pressure range, a brazing temperature range, and a brazing period range based, at least in part, on a finite element analysis;
- assembling a rocket engine nozzle jacket and a rocket engine nozzle liner to provide a rocket engine nozzle assembly, the rocket engine nozzle liner having a plurality of channels, the space between each channel defining a land, the rocket engine nozzle liner having at least a pair of endlands disposed at each end thereof; and
- sealing the rocket engine nozzle assembly with a plurality of seals, the seals provided between the rocket engine nozzle jacket and the endlands of the rocket engine nozzle liner; and
- pressure brazing the entire rocket engine nozzle assembly using a single pressure brazing operation after said sealing step, the pressure brazing operation using a brazing pressure from the brazing pressure range, a brazing temperature from the brazing temperature range, and a brazing period from the brazing period range.

13. The method of claim 12, wherein the determining comprises:
- performing a finite element analysis to determine an estimate of the brazing pressure range, an estimate of the brazing temperature range, and an estimate of the brazing period range; and
- performing a pressure brazing on at least one subscale model of the rocket engine nozzle assembly with the estimate of the brazing pressure range, the estimate of the brazing temperature range, and the estimate of the brazing period range to determine the brazing pressure range, the brazing temperature range, and the brazing period range.

14. The method of claim 12, wherein the sealing comprises brazing the nozzle jacket and the nozzle liner at a forward end and an aft end of the rocket engine nozzle assembly.

15. The method of claim 12, wherein the sealing comprises welding the nozzle jacket and the nozzle liner at a forward end and an aft end of the rocket engine nozzle assembly.

16. The method of claim 12, wherein the single pressure brazing operation comprises:
- evacuating the rocket engine nozzle assembly;
- placing the rocket engine nozzle in a furnace;
- pressurizing the furnace to the brazing pressure;
- ramping up a temperature in the furnace to the brazing temperature;
- holding the brazing pressure and the brazing temperature for the brazing period; and
- ramping down the temperature in the furnace while holding the furnace pressurized at the brazing pressure.

* * * * *